United States Patent [19]
Magoffin

[11] Patent Number: 5,988,227
[45] Date of Patent: Nov. 23, 1999

[54] PROTECTIVE SHIELD FOR ELONGATED UNDERGROUND UTILITIES

[75] Inventor: Howard G. Magoffin, St. Louis, Mo.

[73] Assignee: Tuff-N-Nuff Industries, British Columbia, Canada

[21] Appl. No.: 09/045,230

[22] Filed: Mar. 20, 1998

[51] Int. Cl.$^6$ ................................................... F16L 55/10
[52] U.S. Cl. .......................... 138/110; 138/128; 138/105; 138/110; 405/157; 405/154
[58] Field of Search .................................. 138/128, 105, 138/110, 151, 157; 405/157, 154

[56] References Cited

U.S. PATENT DOCUMENTS

| | | | |
|---|---|---|---|
| 2,650,619 | 9/1953 | Phlaumer | 138/105 |
| 3,237,647 | 3/1966 | Jordon | 138/128 |
| 3,251,382 | 5/1966 | Tatsch | 138/151 |
| 3,336,951 | 8/1967 | Huelster | 138/151 |
| 3,473,339 | 10/1969 | Schafly, Jr. | 138/105 |
| 3,504,503 | 4/1970 | Allen et al. | 405/157 |
| 4,068,488 | 1/1978 | Ball | 138/105 |
| 4,576,206 | 3/1986 | Lauren | 138/151 |
| 4,767,237 | 8/1988 | Cosman et al. | 405/157 |
| 5,006,806 | 4/1991 | Rippingdale et al. | 405/157 |
| 5,036,210 | 7/1991 | Goodman | 405/157 |
| 5,099,889 | 3/1992 | Ratzlaff | 138/110 |
| 5,200,704 | 4/1993 | Clark, Jr. et al. | 405/157 |
| 5,310,594 | 5/1994 | Holland et al. | 138/128 |
| 5,527,070 | 6/1996 | Blackwell | 138/105 |

Primary Examiner—Denise L. Ferensic
Assistant Examiner—Davis Hwu
Attorney, Agent, or Firm—Polster, Lieder, Woodruff & Lucchesi

[57] ABSTRACT

A protective shield for elongated underground utilities such as an elongated underground utility strand or pipe is disclosed. The protective shield includes a foldable elongated flexible sheet of shock absorbing material adapted to both overlie and underlie the elongated underground utilities. The foldable elongated flexible sheet of shock absorbing material includes at least one longitudinally extending fold line that extends in the same direction as the elongated underground utilities and may be transversely offset from a longitudinal midpoint of the foldable elongated flexible sheet of shock absorbing material. In some instances, the foldable elongated flexible sheet of shock absorbing material may include two longitudinally extending fold lines that are transversely offset on each side of a longitudinal midpoint area of the foldable elongated flexible sheet of shock absorbing material. The foldable elongated flexible sheet includes an upper overlying panel and a lower underlying panel such that end marginal areas of the upper overlying panel and lower underlying panel are juxtaposed one another when protecting the elongated underground utilities. The foldable elongated flexible sheet preferably comprises a flexible porous filamentary mat to enable moisture to be dissipated from around elongated underground utilities while also permitting cathodic testing therethrough.

15 Claims, 4 Drawing Sheets

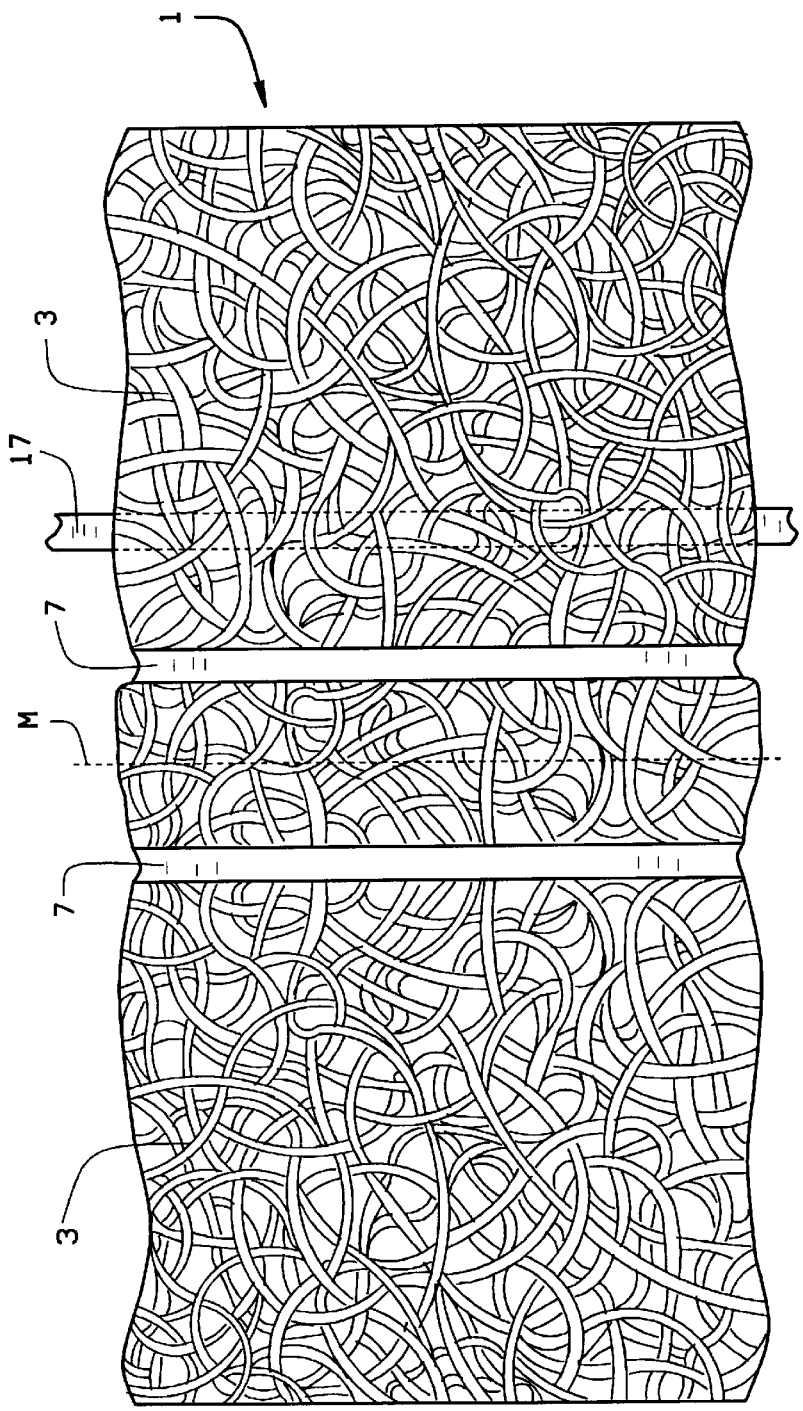
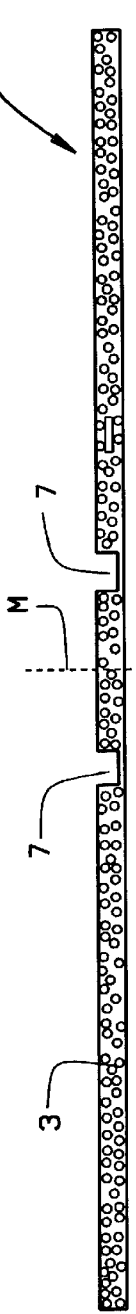
FIG. 2
FIG. 3

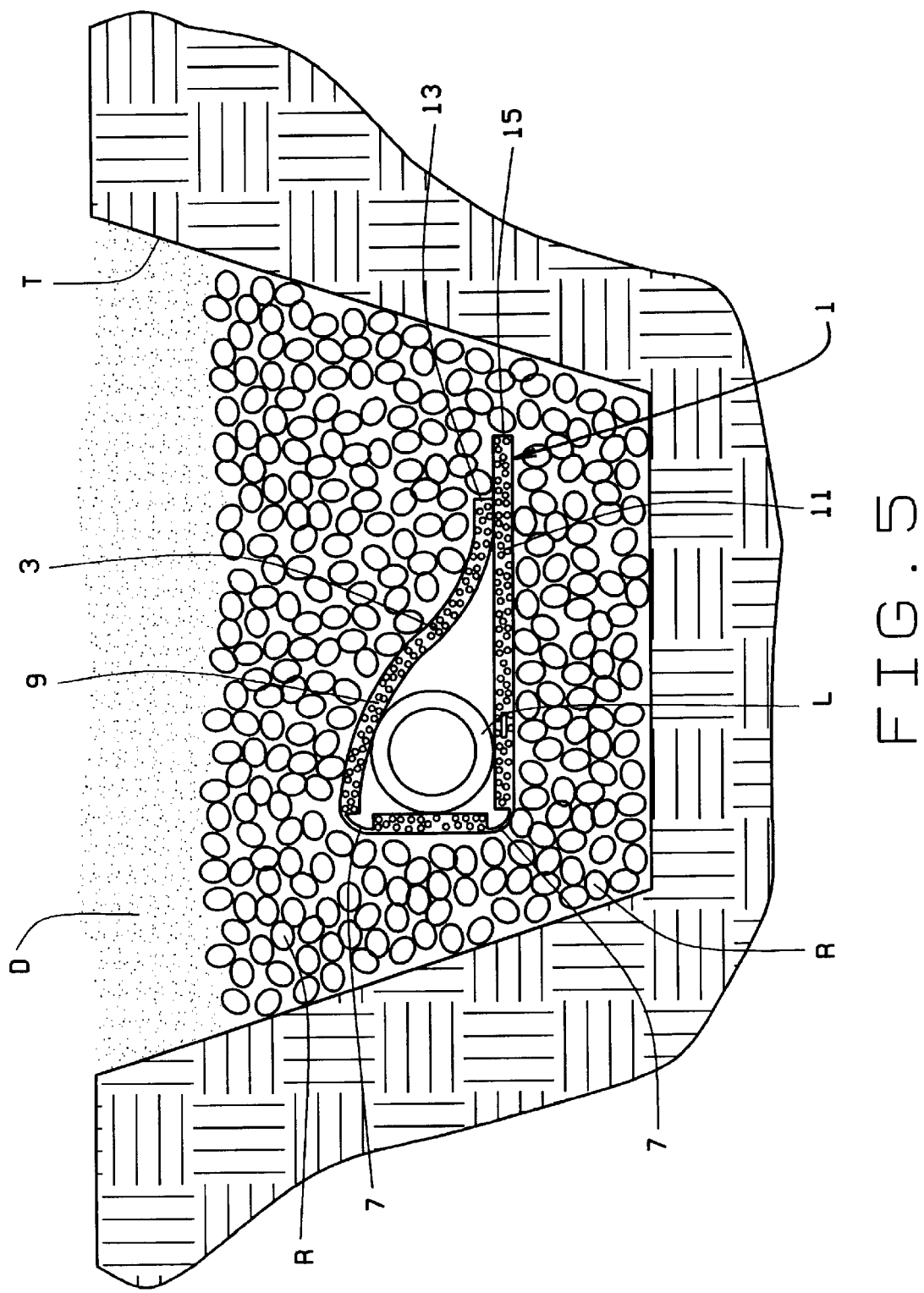

PROTECTIVE SHIELD FOR ELONGATED UNDERGROUND UTILITIES

CROSS-REFERENCE TO RELATED APPLICATIONS

This is a co-pending patent application to U.S. patent application Ser. No. 09/045,231, filed Mar. 21, 1998, entitled MULTI-FOLD MAT STRUCTURE of the same inventor.

STATEMENT REGARDING FEDERALLY SPONSORED RESEARCH OR DEVELOPMENT

Not Applicable.

BACKGROUND OF THE INVENTION

This invention relates to a protective shield for elongated underground utilities such as an elongated underground utility strand or pipe (i.e. steel pipe, plastic pipe, electric conduit, fiber optic cables and other elongated underground utility strands or pipes). The protective shield protects the elongated underground utilities as they are being laid in a trench, during subsequent back-filling of the trench and covering of the elongated underground utilities, and during prolonged use under a variety of conditions and exposures.

It will be appreciated that care must be taken to avoid damaging elongated underground utilities during the laying of same in trenches. Some elongated underground utilities may be subject to corrosion, scratches, marring or impact while other damage may be due to certain ground conditions and exposures.

Because steel pipe is subject to corrosion, it is usually coated with a plastic material during its manufacture as well as having individual welds coated in the field so as to prevent corrosion. While plastic pipes are not subject to corrosion, they are subject to scratches, marring or impact during the laying of the pipe in a trench, as well as during subsequent back-filling of the trench and covering the pipe. Electrical conduit and fiber optic cable are also subject to damage due to marring or impact during the covering and back-filling of same in a trench. Prolonged use of elongated ground utilities can also result in damage under certain conditions and exposures. For example, in the laying of plastic gas transmission pipe on a rock bed in a trench and the subsequent back-filling over the plastic gas transmission pipe with more gravel and dirt on top of the plastic gas transmission pipe, damage to the pipe may occur when vehicular traffic drives over the back-filled trench a number of times. This can lead to bursting of the pipe and explosions creating significant health risk to humans.

As explained in U.S. Pat. No. 5,099,889, the prior art has developed many ways in which to protect and cover such underground utilities including the use of sand, sand bags, foam plastic pads and poured-in-place foam plastic product. In order to overcome the difficulties and expenses in applying such aforementioned techniques, the external pipe protector of U.S. Pat. No. 5,099,889 was developed. The invention of this aforementioned patent includes an elongated flexible sheet of shock absorbing material that was enabled to be quickly and conveniently wrapped about and fastened in an encircling relationship to an elongated length of pipe. The flexible sheet of shock absorbing material was disclosed as being preferably constructed as a flexible porous mat in order to enable moisture to be dissipated from around the elongated length of pipe, while further permitting cathodic testing of same for crack and rust deposits, by enabling a charged electrical rod to be inserted through the open construction of the flexible porous mat.

While the technique disclosed in U.S. Pat. No. 5,099,889 overcomes many of the problems of the prior art, it nonetheless has been difficult and somewhat labor intensive to wrap the flexible sheet of shock absorbing material around an elongated length of pipe. As will be appreciated, significant manual labor is required in wrapping the flexible sheet of shock absorbing material around the length of pipe and securing same in position to avoid damage to the elongated length of pipe. As a result, there has been a long felt need in the art for an even simpler and less expensive system for quickly and easily applying an effective protective shield, while at the same time minimizing labor costs.

BRIEF SUMMARY OF THE INVENTION

Among the several objects and advantages the present invention include:

the provision of a new and improved protective shield for elongated underground utilities such as an elongated underground utility strand or pipe which protects the elongated underground utility strand or pipe during the laying of same in a trench, during subsequent back-filling of the trench and covering the strand or pipe, and during subsequent long term use;

the provision of the aforementioned protective shield which can be quickly and easily applied in the field without substantial labor, as compared to other prior art techniques;

the provision of the aforementioned protective shield for elongated underground utilities including a foldable elongated flexible sheet of shock absorbing material that is capable of being quickly and conveniently positioned in overlying and underlying relationship to the elongated underground utilities;

the provision of the aforementioned protective shield for elongated underground utilities which includes at least one longitudinally extending fold line that extends in the same direction as the elongated underground utilities in order to facilitate folding of same in overlying and underlying relationship to the elongated underground utilities;

the provision of the aforementioned protective shield in which the foldable elongated flexible sheet of shock absorbing material includes an upper overlying panel and lower underlying panel with marginal areas of the upper overlying panel and lower underlying panel being juxtaposed one another when protecting elongated underlying utilities so as to prevent rock from entering the space between the upper overlying panel and the lower underlying panel;

the provision of the aforementioned protective shield which is constructed as a flexible porous mat to enable moisture to be dissipated from around the pipe while permitting cathodic testing of steel pipe for crack and rust deposits by enabling a charged electrical rod to be inserted through the open construction of the flexible porous mat;

the provision of the aforementioned protective shield which may include a longitudinally metal ribbon to facilitate the location of elongated underground utilities when made from nonmetallic materials; and the provision of the aforementioned protective shield which is efficient and economical to manufacture, is capable of being wound into a roll for shipping purposes, can be manufactured and/or cut in any desired width or length for desired applications, does not deteriorate when in use, and is otherwise will adapt for the purposes intended.

Briefly stated, the protective shield of the present invention is constructed for use with elongated underground utilities such as an elongated underground utility strand (i.e., steel pipe, plastic pipe, electrical conduit, fiber optic cable and other elongated underground utility strands).

The protective shield includes a foldable elongated flexible sheet of shock absorbing material adapted to both overlie and underlie the elongated underground utilities. The foldable elongated flexible sheet of shock absorbing material includes at least one longitudinally extending fold line that extends in the same direction as the elongated underground utilities. The at least one longitudinally fold line may be transversely offset from the longitudinal midpoint area of the foldable elongated flexible sheet of shock absorbing material.

In some instances, two longitudinally extending fold lines that extend in the same direction as the elongated underground utilities may be provided. The two longitudinally extending fold lines may also be transversely offset on each side of a longitudinal midpoint area of the foldable elongated flexible sheet of shock absorbing material. Additional fold lines may be provided as desired.

The foldable elongated flexible sheet of shock absorbing material includes an upper overlying panel and a lower underlying panel with marginal areas of the upper overlying panel and lower underlying panel being juxtaposed one another when protecting elongated underground utilities. In this way, rock or other damaging elements are prevented from entering the space between the upper overlying panel and lower underlying panel.

The flexible sheet of shock absorbing material preferably comprises a flexible porous filamentary mat. Such construction enables moisture to be dissipated from around the elongated underground utilities while also permitting cathodic testing therethrough. The flexible porous filamentary mat preferably includes a plurality of elongated filaments of thermoplastic and resilient shock absorbing material arranged in an irregular pattern of overlapped and interengaged filaments.

When the elongated underground utilities are made from non-metallic materials such as plastic pipes, the flexible sheet of shock absorbing materials is preferably provided with a longitudinally extending metal ribbon to facilitate the location of the non-metallic elongated underground utilities.

The protective shield may be made in any width or length as desired, but preferably is designed to be wound on itself to facilitate shipping, handling and subsequent use in the field.

These and other objects and advantages of the present invention will become apparent from the discussion that follows.

BRIEF DESCRIPTION OF THE SEVERAL VIEWS OF THE DRAWINGS

In the drawings,

FIG. 2 is a fragmentary top plan view of the foldable elongated flexible sheet of the present invention;

FIG. 3 is a end elevational view of the foldable elongated flexible sheet of shock absorbing material shown in FIG. 2;

FIG. 5 is a fragmentary side elevational view of a trench containing a larger diameter elongated underground utility strand positioned in proximity to longitudinal fold lines of a protective shield, also in a typical back-filled rock environment of a trench.

Corresponding reference numerals will be used throughout the various figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

In the discussion that follows, the term elongated underground utilities shall be interpreted to mean any type of elongated underground utility strand such as steel pipe, plastic pipe, electrical conduit, fiber optic cables and any other type of elongated underground utility strand. In a similar manner, the term length of pipe shall also be interpreted to mean an elongated underground utility strand of the type discussed above.

The protective shield of the present invention is constructed for the use and protection of elongated underground utilities during the laying of same in a trench, during subsequent back-filling of the trench and covering of the elongated underground utilities, and during subsequent long-term use. In addition to protecting the elongated underground utilities from damage, it will become apparent that the protective shield of the present invention can be quickly, conveniently and easily applied to elongated underground utilities with a minimum of skill and effort, resulting in significant labor savings, as well.

While the protective shield of the present invention is not limited to the size, shape or configuration shown nor the specific size of the elongated underground utilities, it has been found that typical practical applications for the protective shield of the present invention are most applicable to elongated underground utilities of the type presently to be described. Specifically, the protective shield of the present invention has typical practical application for steel pipe of 2" and under, plastic gas transmission pipe of up to 6", electrical conduit from ¼" to 1" and fiber optic cable of ½' in thickness. Again, the diameter or width of the elongated underground utilities may change as new technologies are developed; however, up to the present time, the typical practical applications are those as described above with the understanding, of course, that the present invention is not limited to the size or shape of the elongated underground utilities or the protective shield required for same.

Figure 1:
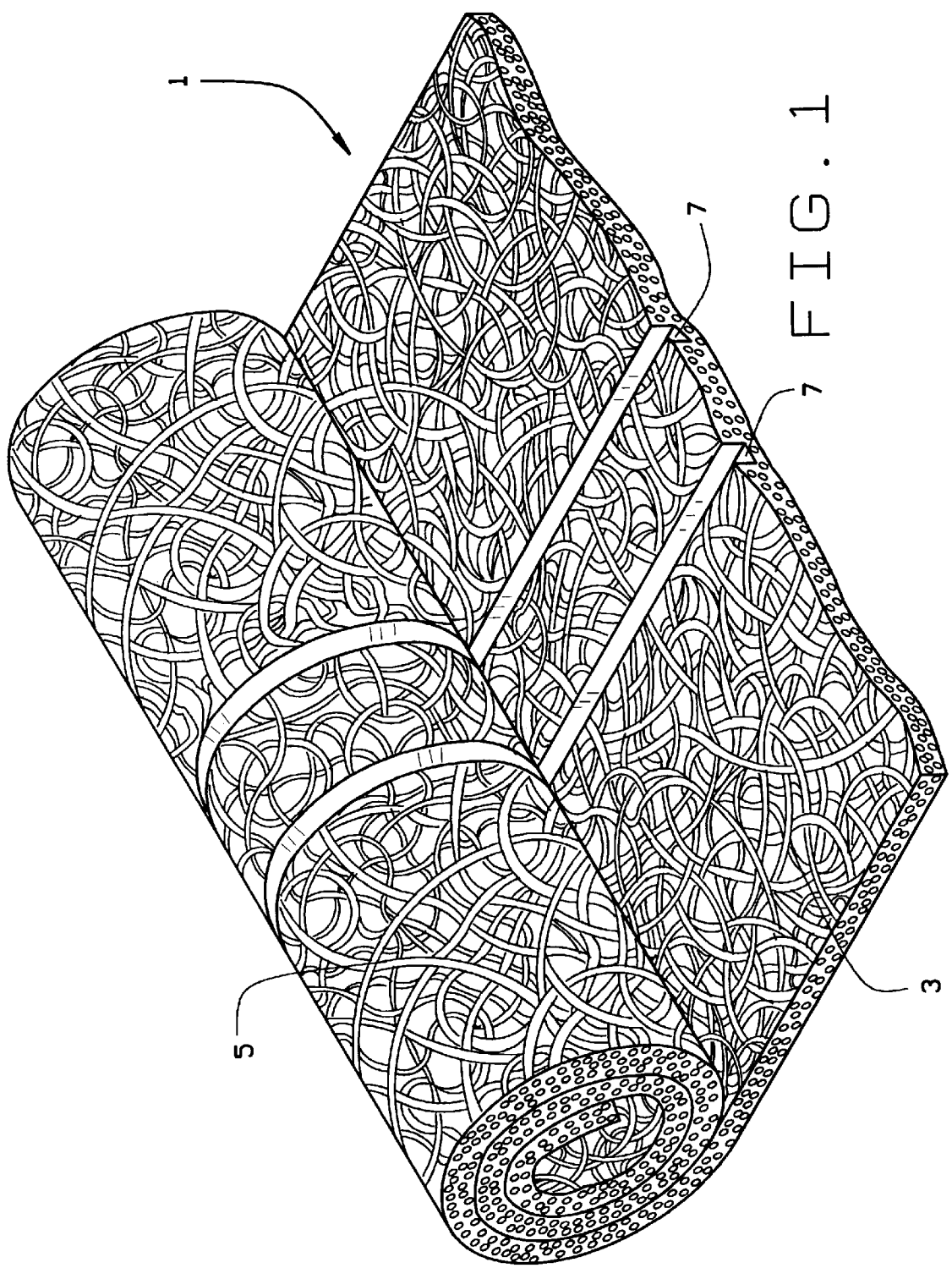
FIG. 1 is a fragmentary top perspective view of a foldable elongated flexible sheet of shock absorbing material wound in a roll to facilitate shipping, handling and subsequent use in the field.
Figure 4:
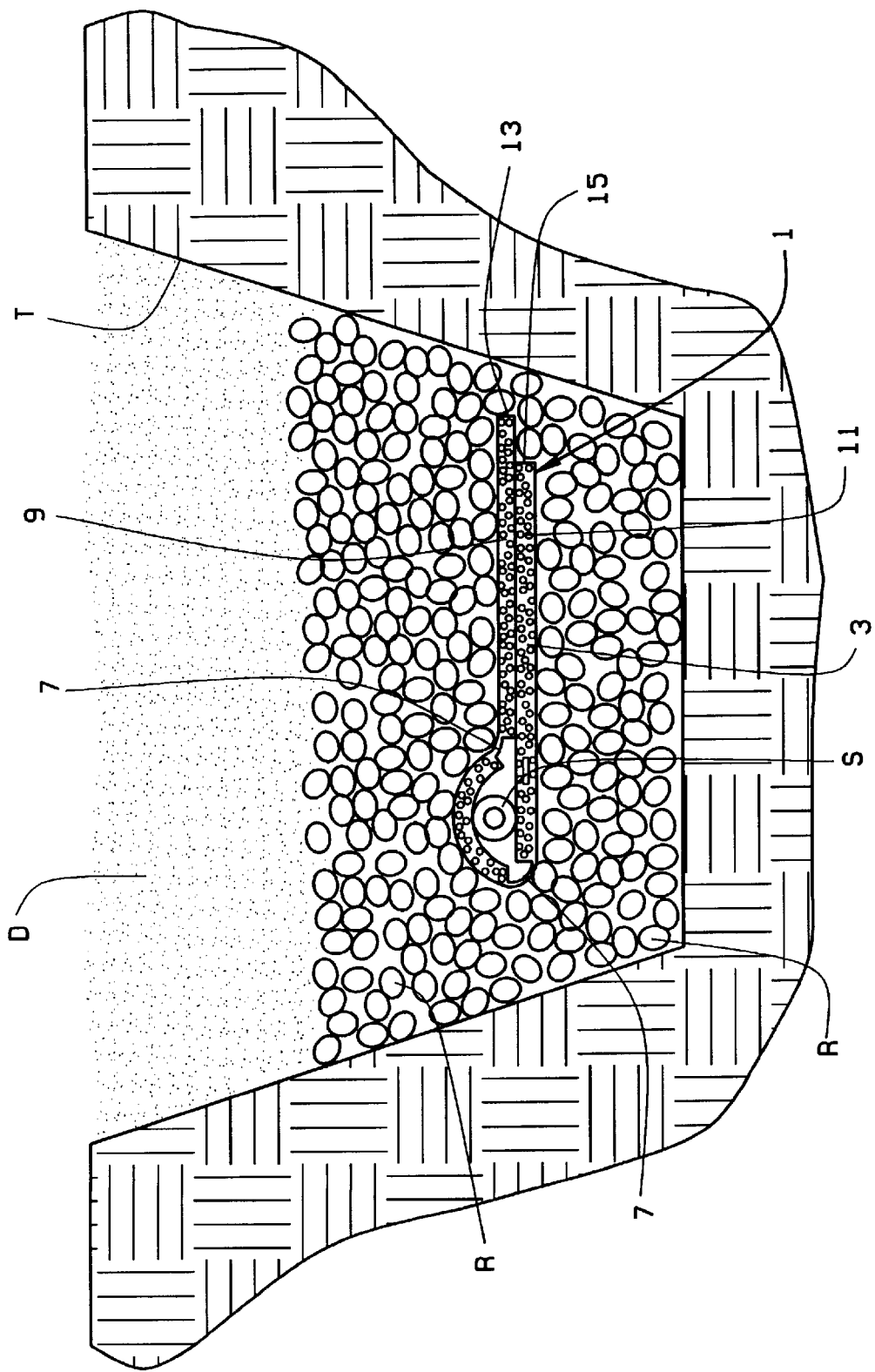
FIG. 4 is a fragmentary side elevational view of a trench showing the manner in which the protective shield of the present invention protects an elongated underground utility strand in a typical back-filled rock environment.

The protective shield 1 of the present invention is best shown in FIGS. 1–3 of the drawings with its use or application shown in FIGS. 4–5 of the drawings. The protective shield 1 is shown in FIGS. 4–5 of the drawings as protecting the smaller elongated underground utility strand or pipe S in FIG. 4 and a larger elongated underground utility strand or pipe L in FIG. 5. In both FIGS. 4 and 5, the protective shield 1 surrounds either the smaller or larger elongated underground utility strand or pipe, S, L, respectively, while the protective shield 1 rests on a rock bed R with surrounding rocks R back-filled above the protective shield 1 and with the remainder of the trench T back-filled with dirt D.

FIGS. 1–3 of the drawings best illustrate the construction of the protective shield 1 of the present invention. There, it will be seen that the protective shield 1 includes a flexible sheet of shock absorbing material 3 which preferably has a porous or open weave construction. As illustrated in the drawings, the flexible sheet of shock absorbing material 3 comprises a porous filamentary mat which includes a plurality of elongated filaments of thermoplastic and resilient materials, preferably polyvinyl chloride. The plurality of elongated filaments of thermoplastic and resilient material are arranged in an irregular pattern of overlapped and interengaged filaments, as illustrated. This provides a flexible mat or sheet 3 which is capable of being wound into a roll 5 as illustrated in FIG. 1 of the drawings for transportation and storage purposes. The flexible sheet of shock absorbing material 3, due to its porous or open weave construction and sufficient height such as that illustrated in FIGS. 1–3, provides a durable, long-lasting sheet of shock absorbing material 3 for use as the protective shield 1 of the present invention.

The porous filamentary mat 3 may be made in various constructions and by a variety of different methods. One particular efficacious method is shown in U.S. Pat. No. 4,351,683 as one preferred procedure for making open porous integrated filamentary mats. Another method for making a porous filamentary mat is disclosed in U.S. Pat. No. 5,055,151. The above patents illustrate several different types and constructions of porous filamentary mats which can be used as the flexible sheet or mat of shock absorbing material 3 in the protective shield 1 of the present invention. Obviously, other methods than those disclosed in the aforementioned patents and other flexible sheets of shock absorbing material 3 can be used in forming the protective shield 1 of the present invention. For example, a porous sheet of foam plastic material could be used as well as other types of shock absorbing sheets, as may be desired.

During manufacture, the protective shield 1 prior to being wound into the roll 5 shown in FIG. 1, is formed with one or more longitudinally extending fold lines 7 which extend in the same direction as the elongated flexible sheet of shock absorbing material 3. As it will also be understood in the discussion that follows, the one or more longitudinally extending fold lines 7, when used at a construction site in the field, also extend in the same direction as the elongated underground utilities.

Each longitudinally extending fold line 7 is formed in the flexible sheet of shock absorbing material 3 during the manufacturing process. During the manufacture of the porous filamentary mat of flexible sheet of shock absorbing material 3 shown in FIGS. 1–3 of the drawings, it will be understood that the plurality of elongated filaments of thermoplastic and resilient material are in a heated condition following placement in the irregular pattern of overlapped and interengaged filaments shown in FIGS. 1–3. A cold roller element (not shown), having approximately the same width as each longitudinally extending fold line 7, is forced into the still heated plurality of elongated filaments to form the one or more longitudinally extending fold lines 7. Typically, the one or more cold roller elements (not shown) are spaced a desired distance from an underlying web or table that supports the porous filamentary mat of shock absorbing material 3 in order to form the longitudinally extending fold line 7 with the size and depth such as that illustrated in FIGS. 2 and 3 of the drawings.

Following the manufacture of the porous filamentary of shock absorbing material 3 with one or more longitudinally extending fold lines 7 shown in FIGS. 1–3 of the drawings, the mat of shock absorbing material 3 is preferably wound into the roll 5 for storage and transportation services. In this regard, it will be noted that the roll 5 is wound in the same direction as the longitudinally extending fold lines 7.

When the protective shield 1 is provided with at least one longitudinally extending fold line 7, it is preferably transversely offset from the longitudinal midpoint area M of the flexible sheet of shock absorbing material 3. This enables the protective shield 1 to be provided with an upper overlying panel 9 and lower underlying panel 11 when folded about the at least one longitudinally extended fold line 7, as will be described in connection with FIG. 4 of the drawing. When the elongated flexible sheet of shock absorbing material 3 is provided with two longitudinally extending fold lines, 7, 7, as illustrated in FIGS. 1–3 of the drawings, each of the two longitudinally extending fold lines, 7, 7 are also transversely offset on each side of the longitudinal midpoint area M of the foldable elongated flexible sheet of shock absorbing material 3. Such a construction is preferably used in conjunction with larger elongated underground utility strands or pipes L, as will be discussed in connection with FIG. 5 of the drawings.

When shipped to a construction site, the protective shield 1 is ready for immediate use, without any fastening strip or other fastening means. In fact, very little effort is required in positioning the protective shield 1 about an elongated underground utility strand or pipe. As best illustrated in FIGS. 4–5 of the drawings, all of that is required is for the protective shield 1 to be folded about one or more longitudinally extending folds 7, depending upon the size of the elongated underground utility strand or pipe. In FIG. 4 of the drawings, it will be seen that the small elongated underground utility strand or pipe S requires the use of only one fold 7 to provide an upper overlying panel 9 and a lower underlying panel 11 for the smaller elongated underground utility strand or pipe S. Thus, in the protective shield 1 shown in FIG. 4 of the drawings, only a single longitudinally extending fold line 7 is required even though two fold lines 7, 7 are shown. However, it will be appreciated that due to the transversely offset relationship of the longitudinal fold lines 7, 7, on each side of the longitudinal midpoint area M of the flexible sheet of shock absorbing materials 3, only of the two fold lines 7, 7 protective shield 1 construction need also be used with a smaller elongated underground utility strand or pipe S as shown in FIG. 4 of the drawings.

It is important to note that the upper overlying panel and lower underlying panel 11 have sufficient width or dimension in order to enable end marginal areas to become juxtaposed to one another, as illustrated in FIG. 4 of the drawings so as to prevent rocks or other elements from entering the upper overlying panel 9 and lower underlying panel 11. In the FIG. 4 construction site use, it will be noted that the upper overlying panel 9 has its end marginal area 13 extending beyond the end marginal area 15 of the lower underlying panel 11, while remaining essentially juxtaposed to one another in order to prevent the entry of rock or other foreign debris between the upper overlying panel 9 and lower underlying panel 11.

In the FIG. 5 application or use, the protective shield 1 is shown as surrounding a larger elongated underground utility strand or pipe L with both longitudinally extending fold lines 7, 7 in use. The size of the larger elongated underground utility strand or pipe L dictates that each of the longitudinally extending fold lines, 7, 7 will be used in folding the elongated flexible sheet of shock absorbing material 3 about the larger elongated underground utility strand or pipe L. In this connection, a field worker will simply need to place the larger underground utility strand L in proximity to the longitudinally extending fold lines 7, 7 and then flip the upper overlying panel 9 to the position illustrated in FIG. 5 where it overlies the lower underlying panel 11. Again, both the upper overlying panel 9 and lower underlying panel 11 have sufficient dimension or width in order to enable end marginal areas 13, 15 to be positioned in proximity to one anther. In this particular instance, the end marginal area 13 of the upper overlying panel 9 does not extend as far as the end marginal area 15 of the lower underlying panel 11, and yet the end marginal areas 13, 15 remain in close proximity so as to prevent rocks or other foreign debris from entering into the space between the upper overlying panel 9 and the lower underlying panel 11.

It will be appreciated that rocks are deposited above the protective shield 1 after being positioned as shown in FIGS. 4–5 of the drawings. When the protective shield 1 of the present invention is used in connection with elongated underground utility strands or pipes, it has been found that very little or no damage results. This is due to the manner in which the protective shield 1 surrounds the elongated underground utility strand or pipe by the foldable elongated flexible sheet of shock absorbing material 3 while preventing any entry of rock or other foreign matter between the upper overlying panel 9 and lower underlying panel 11 of the protective shield 1.

In addition to affording sufficient protection to an elongated underground utility strand or pipe, the protective shield one of the present invention is easily and quickly assembled by an unskilled worker in the field. As will be appreciated, all that the unskilled worker needs to do is to fold the protective shield 1 about the one or more longitudinally extending fold lines 7 in order to position the protective shield 1 in protective and surrounding relationship as illustrated in FIGS. 4 and 5 of the drawings. No fastening or adhesive is required since the sufficient width or dimension of the upper overlying panel 9 and the lower underlying panel 11 enables the respective end marginal areas 13, 15 to be positioned in proximity orjuxtaposition relative to one another so as to prevent the entry of rock or other foreign debris between the upper overlying panel 9 and lower underlying panel 11. As a result, significant labor cost savings result, as compared to other prior art techniques.

The porous filamentary mat of flexible shock absorbing material 3 also enables moisture to be dissipated from around the elongated underground utility or pipe while also permitting cathodic testing therethrough. The open weave construction of the porous filamentary mat thus allows moisture to be quickly dissipated from around the elongated underground utility strand while enabling a probe to be inserted through the porous filamentary mat for cathodic testing of steel pipe. In those instances where the elongated underground utility strand or pipe is made from a non-metallic material, the flexible sheet of shock absorbing material 3 may be formed with an included longitudinally extending metal ribbon 17 as shown in FIG. 2 of the drawings, in order to facilitate the location of the non-metallic elongated underground utility strand or pipe.

In view of the above, it will be seen that the several objects and features of this invention are achieved in other advantageous results obtained.

As various changes could be made in the above constructions without departing from the scope of the invention, it is intended that all matter contained in the above description are shown in the accompanying drawings shall be interpreted as an illustrative and not in a limiting sense.

I claim:

1. A method of installing a protective shield for elongated underground utilities during the laying of elongated underground utilities in a trench, including the steps of: providing a foldable elongated flexible sheet of shock absorbing material having an upper overlying panel and a lower underlying panel adapted to both overlie and underlie the elongated underground utilities, placing the elongated underground utilities on the lower underlying panel in the trench, folding the foldable elongated flexible sheet of shock absorbing material to position the upper overlying panel above the elongated underground utilities, the placement and positioning of the upper overlying panel and lower underlying panel relative to the elongated underground utilities causing end marginal areas of the upper overlying panel and lower underlying panel to be readily juxtaposed in overlapping relationship to one another in order to protect the elongated underground facilities within the folded elongated flexible sheet of shock absorbing material, and backfilling the trench and covering the folded elongated flexible sheet of shock absorbing material that surrounds the elongated underground utilities, the aforementioned steps affording the protective shield to be quickly, conveniently and easily installed relative to elongated underground utilities with a minimum of skill and effort.

2. The method as defined as defined in claim 1 in which the folding and positioning of the foldable elongated flexible sheet of shock absorbing material is facilitated by at least one longitudinally extending fold line that extends in the same direction as the elongated underground utilities.

3. The method as defined in claim 2 in which the at least one longitudinally extending fold line is formed transversely offset from a longitudinal midpoint area of the foldable elongated flexible sheet of shock absorbing material.

4. The method as defined in claim 2 including the forming of two longitudinally extending fold lines that extend in the same direction as the elongated underground utilities and are transversely offset on each side of a longitudinal midpoint area of the foldable elongated flexible sheet of shock absorbing material.

5. A method of installing a protective shield for an elongated underground utility strand during the laying of the elongated underground utility strand in a trench, comprising the steps of providing an elongated flexible sheet of shock absorbing material that extends in the same direction as the elongated underground utility strand, the shock absorbing material including at least one longitudinally extending fold area, the shock absorbing material being first positioned underneath the elongated underground utility strand and then folded to extend above the elongated underground utility strand, the folding of the shock absorbing material also positioning end marginal areas of the shock absorbing material into overlapping juxtaposition with respect to one another in order to provide a surrounding protective shield during the subsequent backfilling of the trench and long term use of the elongated underground utility strand.

6. The method as defined in claim 5 in which the flexible sheet of shock absorbing material is formed as a flexible porous filamentary mat.

7. The method as defined in claim 6 in which the flexible porous filamentary mat is formed with a plurality of elongated filaments of thermoplastic and resilient shock absorbing material arranged in an irregular pattern of overlapped and interengaged filaments.

8. The method as defined in claim 5 in which the flexible sheet of shock absorbing material is formed and constructed to enable moisture to be dissipated from around the length of pipe while also permitting cathodic testing therethrough.

9. The method as defined in claim 5 in which the flexible sheet of shock absorbing material is formed with a longitudinally extending metal ribbon to facilitate the location of the length of pipe when made from non-metallic materials.

10. The method as defined in claim 5 in which the at least one longitudinally extending fold line is formed on one surface of the shock absorbing material that proximately underlies and overlies the length of pipe.

11. The method as defined in claim 5 in which the shock absorbing material is folded and positioned to overlie the width and length of the elongated underground utility strand.

12. The method as defined in claim 5 in which the at least one longitudinally extending fold is formed so as to be traversely offset from a midpoint area of the shock absorbing material.

13. The method as defined in claim 12 in which the at least one traversely offset longitudinally extending fold line enables the folding and positioning to overlie the width and length of the elongated underground utility strand.

14. The method as defined in claim 5 including at least two longitudinally extending fold lines formed in the shock absorbing material that extends in the same direction as the elongated underground utility strand the and are transversely offset from a longitudinal midpoint area of the shock absorbing material.

15. A method of installing a protective shield for an elongated underground utility strand during the laying of the elongated underground utility strand in a trench, including the steps of providing an elongated flexible porous sheet of shock absorbing material having an upper panel and a lower panel separated by at least one longitudinally extending foldable area, the lower panel being positioned underneath the elongated underground utility strand while the upper panel is folded to overlie the elongated underground utility strand, the folding of the shock absorbing material causing end marginal areas of the upper overlying panel and lower underlying panel to be readily juxtaposed in overlapping relationship to one another protecting the elongated underground utility strand during the subsequent backfully of the trench and long term use of the elongated underground utility strand.

* * * * *

UNITED STATES PATENT AND TRADEMARK OFFICE
CERTIFICATE OF CORRECTION

PATENT NO. : 5,988,227
DATED : November 23, 1999
INVENTOR(S) : Howard G. Magoffin It is certified that error appears in the above-identified patent and that said Letters Patent is hereby corrected as shown below:

Col. 8, Line 18"
  Delete "backfilling" insert --back-filling--

Col. 8, Line 25
  Delete the second "as defined"

Col. 8, Line 54
  Delete "backfilling" insert --back-filling--

Col. 10, Line 1
  Delete "the"

Col. 10, Line 17
  Delete "backfully" insert --back-filling--

Signed and Sealed this

Twenty-second Day of May, 2001

*Attest:*

NICHOLAS P. GODICI

*Attesting Officer*      *Acting Director of the United States Patent and Trademark Office*